United States Patent
Bhargava

(10) Patent No.: US 11,457,072 B2
(45) Date of Patent: Sep. 27, 2022

(54) NETWORK CONNECTION AND MAINTENANCE

(71) Applicant: Arm Cloud Technology, Inc., San Jose, CA (US)

(72) Inventor: Vishal Bhargava, Noida (IN)

(73) Assignee: Izuma Tech, Inc., San Jose, CA (US)

( * ) Notice: Subject to any disclaimer, the term of this patent is extended or adjusted under 35 U.S.C. 154(b) by 10 days.

(21) Appl. No.: 16/933,104

(22) Filed: Jul. 20, 2020

(65) Prior Publication Data

US 2022/0021739 A1     Jan. 20, 2022

(51) Int. Cl.
| | |
|---|---|
| *H04W 84/12* | (2009.01) |
| *H04L 67/145* | (2022.01) |
| *H04W 76/38* | (2018.01) |
| *H04W 84/18* | (2009.01) |

(52) U.S. Cl.
CPC ........... *H04L 67/145* (2013.01); *H04W 76/38* (2018.02); *H04W 84/12* (2013.01); *H04W 84/18* (2013.01)

(58) Field of Classification Search
CPC ....................................... H04L 12/28
USPC .......................................................... 370/329
See application file for complete search history.

(56) References Cited

U.S. PATENT DOCUMENTS

| | | | | |
|---|---|---|---|---|
| 2007/0180081 | A1* | 8/2007 | Okmianski | H04L 29/1249 709/223 |
| 2010/0061272 | A1* | 3/2010 | Veillette | H04L 45/48 370/254 |
| 2019/0286806 | A1* | 9/2019 | Robinson | H04W 12/64 |

* cited by examiner

*Primary Examiner* — Dang T Ton

(74) *Attorney, Agent, or Firm* — Leveque Intellectual Property Law, PC

(57) ABSTRACT

A method and apparatus for network connection and maintenance having reduced connection time, increased probability of successful connection, and increased reliability once connected. A second communication protocol is added to network devices, so that two connection-related operations are performed during overlapping periods of time, thereby reducing required connection time while increasing probability of successful connection. Once a device is connected to the network, network maintenance messages, including re-keying requests and "keep-alive" messages, may be sent via the second communication protocol during periods of network congestion, increasing network reliability.

8 Claims, 7 Drawing Sheets

NETWORK CONNECTION AND MAINTENANCE

BACKGROUND

The time needed to connect to a communication network, and the probability of achieving a successful connection, are important metrics to users and aspiring users of such networks. In networks employing wireless local-area communication protocols, e.g., IEEE Std 802.11™ or Wi-Fi®, an exchange of several messages is typically required to achieve a successful connection, and users desire to minimize the time duration of this exchange. This duration may be extended if a Dynamic Host Configuration Protocol (DHCP) message exchange is also required, as is often the case in communication networks coupled to the Internet. In addition, the loss of one or more of these messages can increase connection time or reduce the probability of achieving a successful connection, both of which are undesirable.

Further, once connected to a network, network users may be disconnected due to inactivity if a transmitted "Keep-Alive" message is not received by the network due to congestion or other channel impairment, requiring a reconnection process. For at least these reasons, an improved network connection and maintenance system and methodology is desired.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
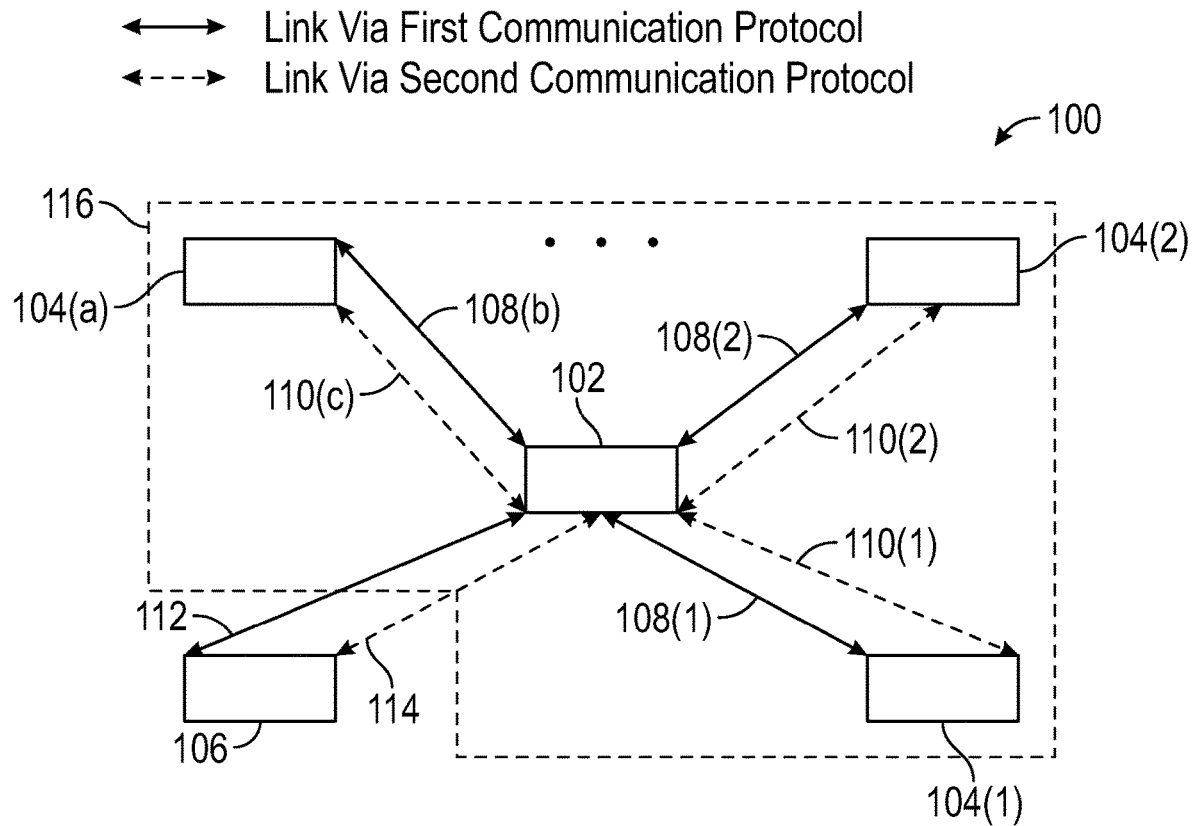
FIG. 1 illustrates a communication network, in accordance with an embodiment.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software or a combination of hardware and software. In a module that includes software, the software may contain one or more routines, or subroutines. One or more modules can make up a program and/or device.

In accordance with certain representative embodiments of the present disclosure, there is provided a mechanism to reduce the time needed for a device to connect to a communication network, while increasing the probability of successful connection. The mechanism is implemented by the addition of a second communication protocol to network devices, and extends existing connection processes by performing multiple connection-related operations during overlapping periods of time to provide both an improvement in required connection time and improved reliability. Further, once connected to the communication network, network maintenance messages (e.g., "Keep-Alive" messages, re-keying requests, address inquiries, et al.) may be sent via the second communication protocol during periods of network congestion, increasing network reliability.

FIG. 1 shows a wireless environment 100 including communication network 116, according to an embodiment. In this embodiment, communication network 116 may be, for example, a wireless local area network (WLAN), although other types of networks, including chip-scale networks, wireless personal area networks (WPANs), wireless body area networks (WBANs), wireless neighborhood area networks (WNANs), wireless metropolitan area networks (WMANs), cellular networks, etc., are also contemplated. In communication network 116, common node 102 is coupled to connected nodes 104(1), 104(2), . . . , 104(a), where a is any appropriate number, via first communication protocol links 108(1), 108(2), . . . , 108(b), where b is any appropriate number. The first communication protocol may be, for example, a wireless, local-area communication protocol, e.g., IEEE Std 802.11™ or Wi-Fi®, although other protocols are also contemplated. Common node 102 is also coupled to connected nodes 104 via second communication protocol links 110(1), 110(2), . . . , 110(c), where c is any appropriate number. The second communication protocol may be, for example, a short-range, low-power, wireless communication protocol, e.g., IEEE Std 802.15.1™, Bluetooth®, Bluetooth Low Energy or Zigbee®, although other protocols are also contemplated.

Common node 102 is also coupled to candidate node 106 via first communication protocol link 112, a link of the first communication protocol, and second communication protocol link 114, a link of the second communication protocol. Candidate node 106 differs from connected nodes 104 in that it is not connected to communication network 116, meaning that, using the terminology of Wi-Fi®, candidate node 106 is neither authenticated nor associated to communication network 116. Candidate node 106 therefore can neither transmit nor receive data messages via first communication protocol link 112 to communication network 116.

Figure 2:
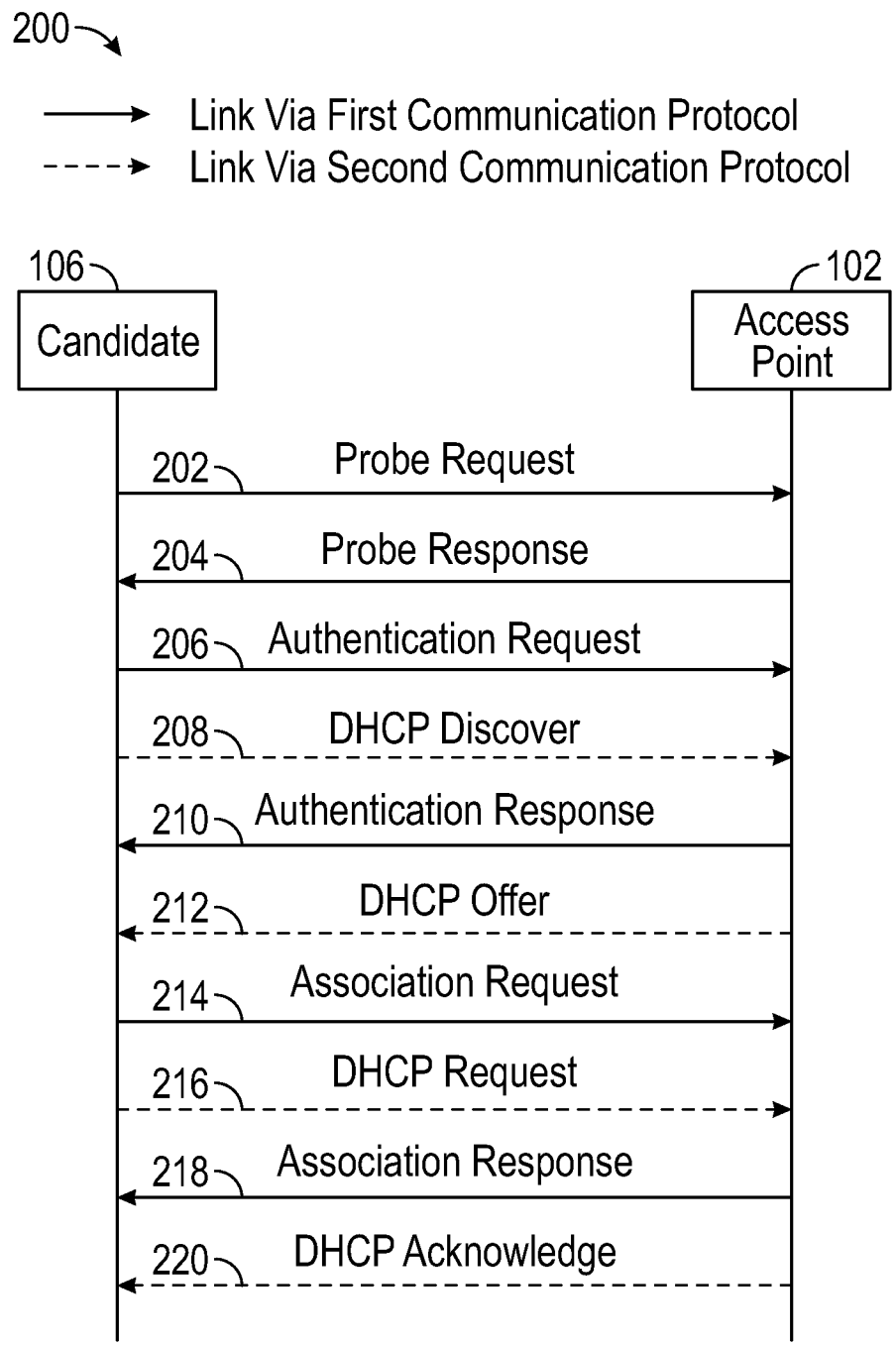
FIG. 2 illustrates a message sequence diagram, in accordance with an embodiment.

FIG. 2 depicts a message sequence chart 200 of an example network connection process, the Wi-Fi® connection process and DHCP DORA (Discover, Offer, Request, Acknowledge) operation, according to an embodiment. Time flows from top to bottom in message sequence chart 200, which depicts connection messages exchanged between candidate node 106 (the "Station" in Wi-Fi® terminology) and common node 102 (the "Access Point" in Wi-Fi® terminology). In this example, the first communication protocol is Wi-Fi®. The second communication protocol is Bluetooth®, although other protocols are also contemplated.

To start the example network connection process, candidate node 106 transmits a Probe Request message 202 via first communication protocol link 112 to identify Wi-Fi® networks in its vicinity. Common node 102 replies with Probe Response message 204, also via the first communication protocol, containing the network name (i.e., its service set identification, SSID) and other parameters.

Upon determining that the received network parameters are acceptable, candidate node 106 next transmits Authentication Request message 206 via the first communication protocol. Candidate node 106 also begins DHCP DORA operation by sending DHCP Discover message 208 to common node 102 via second communication protocol link 114.

Common node 102 replies to Authentication Request message 206 by sending Authentication Response message 210 via first communication protocol link 112, and replies to DHCP Discover message 208 by sending DHCP Offer message 212 via second communication protocol link 114.

Candidate node 106 replies to Authentication Response message 210 by sending Association Request message 214 via first communication protocol link 112, and replies to DHCP Offer message 212 by sending DHCP Request message 216 via second communication protocol link 114.

Common node 102 replies to Association Request message 214 by sending Association Response message 218 via first communication protocol link 112, and replies to DHCP Request message 216 by sending DHCP Acknowledge message 220 via second communication protocol link 114. At this point, with both the Wi-Fi® connection process and the DHCP operation complete, the example network connection process is complete.

Advantageously, performance of the DHCP operation and the Wi-Fi® connection process during overlapping periods of time, via two communication protocol links, reduces the overall time required to complete connection to the network, in contrast to performance of these actions in series via a single communication protocol link.

While messages of the Wi-Fi® connection process must be exchanged in the order presented in FIG. 2 (beginning with Probe Request message 202 and ending with Association Response message 218) and messages of the DHCP operation also must be exchanged in the order presented in FIG. 2 (beginning with DHCP Discover message 208 and ending with DHCP Acknowledge message 220), there is no requirement for message order between the two sequences. For example, should a channel impairment delay transmission of Authentication Response message 210 via first communication protocol link 112, DHCP Offer message 212 may be sent via second communication protocol link 114 prior to the transmission of Authentication Response message 210 via first communication protocol link 112. Should DHCP Acknowledge message 220 be transmitted prior to Association Response message 218, candidate node 106 holds the result of the completed DHCP operation in abeyance until Association Response message 218 is received and the Wi-Fi® connection process has completed.

Figure 3:
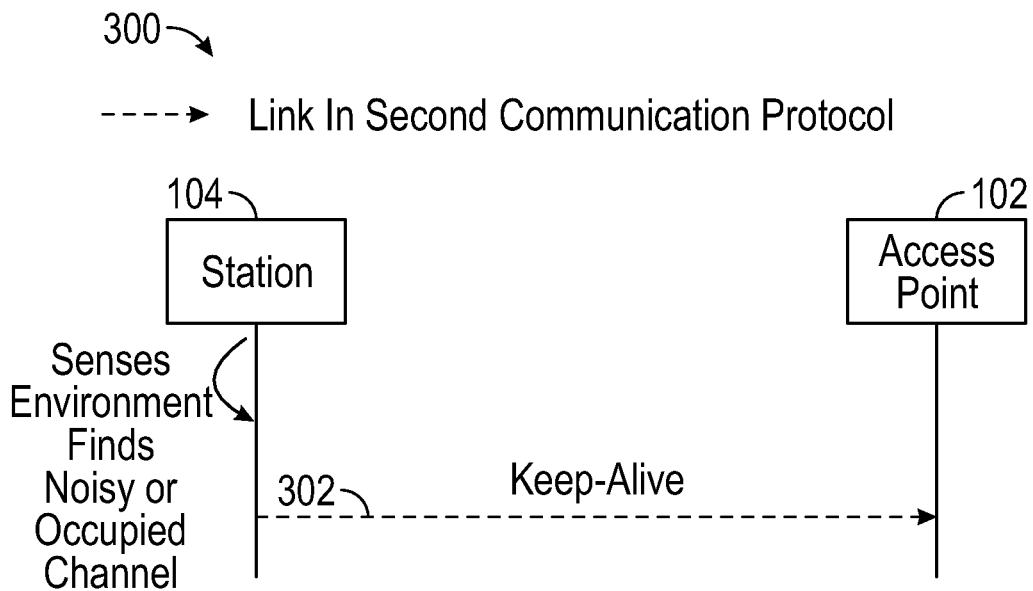
FIG. 3 illustrates a message sequence diagram, in accordance with an embodiment.

FIG. 3 depicts a message sequence chart 300 of an example Keep-Alive process of a first communication protocol, the Keep-Alive process of Wi-Fi®, according to an embodiment. Time flows from top to bottom in message sequence chart 300.

Since memory and other computational resources typically are reserved by common node 102 for connected nodes 104, it is important that common node 102 be aware when a connected node 104 leaves communication network 116, so that these scarce resources may be reallocated. From time to time one or more connected nodes 104 may leave communication network 116 unexpectedly due to, for example, a channel impairment or power failure, without an opportunity to inform common node 102, or may simply lack message traffic for an extended period. To respond to this possibility, a Keep-Alive process is commonly performed for each connected node 104. In this process, a first timeout timer of the first communication protocol (in this example, Wi-Fi®), is assigned to a connected node 104, and a second timeout timer of the first communication protocol is assigned to common node 102.

The first timeout timer is reset upon each transmission to common mode 102, and the second timeout timer is reset upon reception of each message received at common mode 102 from connected node 104. Should the second timeout timer expire, common node 102 disconnects connected node 104 from network 116. Should the first timeout timer expire, a Keep-Alive message is transmitted from connected node 104 to common node 102, informing common node 102 that connected node 104 is still "alive," i.e., still connected to the network, and so should not be disconnected.

However, it is possible that the Keep-Alive message cannot be sent when needed, due to signals, noise, interference or other impairment on first communication protocol link 112. This channel occupancy can be determined, for example, by a carrier-sense multiple-access with collision avoidance (CSMA/CA) procedure. As shown in FIG. 3, and according to an embodiment, in response to a determination of channel occupancy of first communication protocol link 112 (in this example, a Wi-Fi® link), connected node 104 sends Keep-Alive message 302 via second communication protocol link 114 (in this example, a Bluetooth® link) to common node 102. Upon reception of Keep-Alive message 302 by common node 102, the second timeout timer is reset, avoiding disconnection of connected node 104 from network 116.

In another example Keep-Alive process of a first communication protocol, and according to an embodiment, in response to an expiration of a first timeout timer of the first communication protocol (in this example, Wi-Fi®), connected node 104 sends Keep-Alive message 302 via second communication protocol link 114 (in this example, a Bluetooth® link) to common node 102. Upon reception of Keep-Alive message 302 by common node 102, the second timeout timer is reset, avoiding disconnection of connected node 104 from network 116.

Connected node 104 may enter a power-save (sleep) mode of the first communication protocol, in which it may not be able to respond to messages sent to it from common node 102 via first communication protocol link 112. This can be disadvantageous, in that traffic to and from connected node 104 may be delayed.

Figure 4:
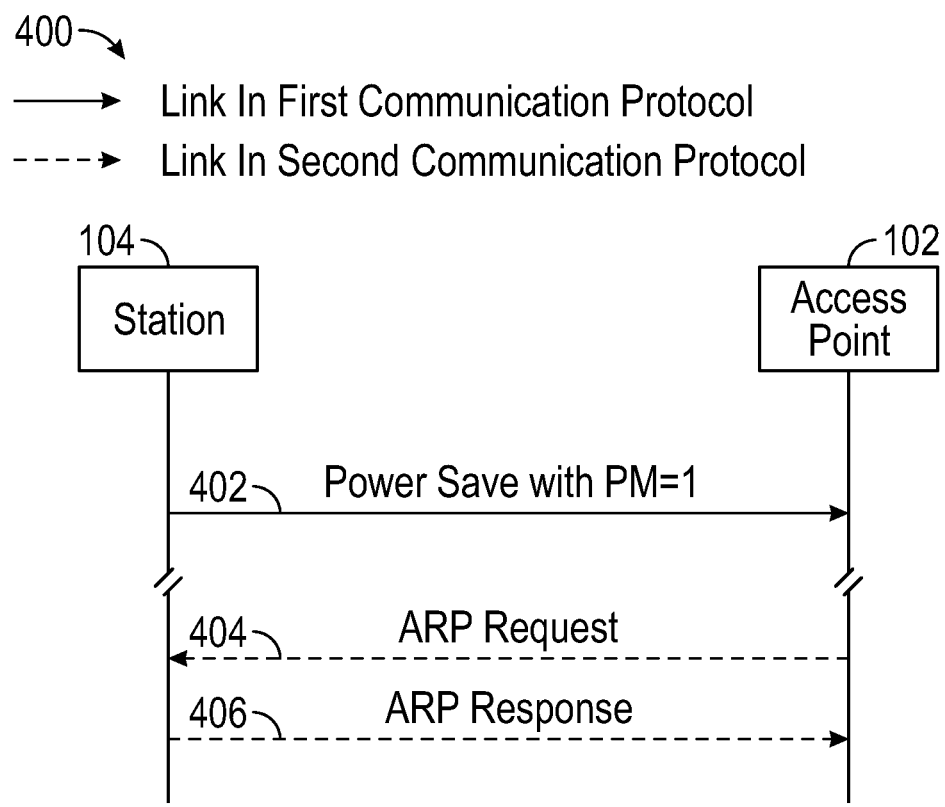
FIG. 4 illustrates a message sequence diagram, in accordance with an embodiment.

FIG. 4 depicts a message sequence chart 400 of an example power-save process of a first communication protocol, the power-save process of Wi-Fi®, followed by an address resolution protocol (ARP) operation, according to an embodiment. Time flows from top to bottom in message sequence chart 400.

As shown in FIG. 4, connected node 104 enters a power-save (sleep) mode of the first communication protocol (in this example, Wi-Fi®) by transmitting Power Save message 402, with the PM parameter set to 1, to common node 102 via first communication protocol link 112. At a subsequent time, common node 102 needs the link layer address of connected node 104. Recognizing that connected node 104 has entered a power-save mode of the first communication protocol, common node 102 sends ARP Request 404 to connected node 104 via second communication protocol link 114 (in this example, a Bluetooth® link). Connected node 104 responds to ARP Request 404 by transmitting the required information in ARP Response 406 via second communication protocol link 114. Advantageously, common node 102 now has the required information (the link layer address of connected node 104), while connected node 104 has remained in the power-save mode of the first communication protocol.

In this manner, many network maintenance functions, such as re-keying and other security operations, may be performed. For example, in addition to ARP operations, common node 102 also may require connected node 104 to perform Extensible Authentication Protocol over LAN (EAPoL) security operations, while connected node 104 remains in a power-save (sleep) mode of the first communication protocol.

Figure 5:
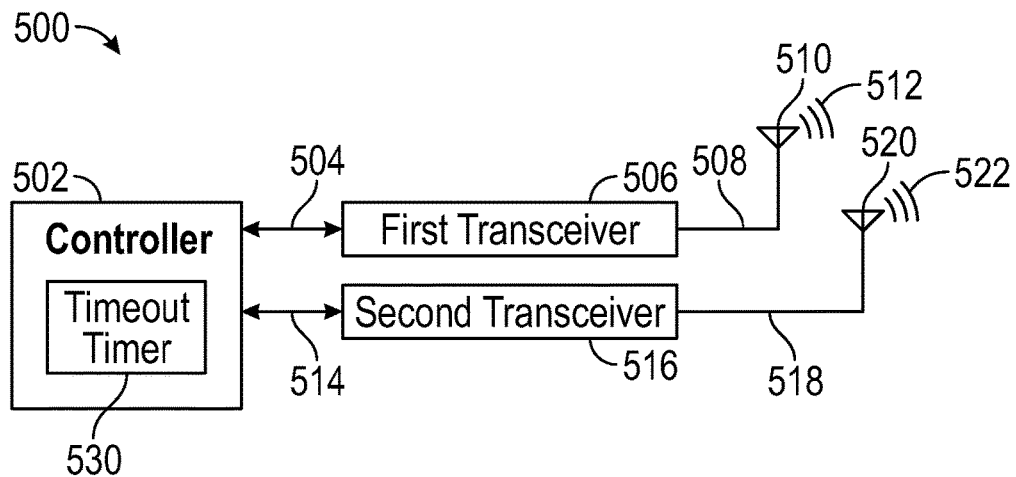
FIG. 5 illustrates a node of a communication network, in accordance with an embodiment.

FIG. 5 depicts a generic network node 500, suitable for common node 102, connected node 104 and candidate node 106, according to an embodiment. Controller 502, comprising timeout timer of a first communication protocol 530, is coupled to first transceiver 506, configurable to transmit and receive signals compatible with the first communication protocol, via first data and control path 504. First transceiver 506 is coupled to first antenna 510 via first feedline 508. First antenna 510 is coupled to first communication protocol link 112 via first radiation 512. Controller 502 is also coupled to second transceiver 516, configurable to transmit and receive signals compatible with a second communication protocol, via second data and control path 514. Second transceiver 516 is coupled to second antenna 520 via second feedline 518. Second antenna 520 is coupled to second communication protocol link 114 via second radiation 522.

To receive a message sent via first communication protocol link 112, the message is coupled via first radiation 512 to first antenna 510, and then to first transceiver 506 via first feedline 508. First transceiver 506 receives the message in consonance with the first communication protocol, and sends the recovered information to controller 502 via first data and control path 504. Controller 502 processes the recovered information, and determines whether a response is required and, if so, whether a response should be sent via first communication protocol link 112, second communication protocol link 114, or both.

If controller 502 determines that a response is required, and should be sent via first communication protocol link 112, information to be placed in the response is sent to first transceiver 506 via first data and control path 504, along with control instructions needed for the transmission. In response to the control instructions received from controller 502, first transceiver 506 transmits the response message in consonance with the first communication protocol to first antenna 510 via first feedline 508. At first antenna 510 the response message is coupled to first communication protocol link 112 via first radiation 512.

However, if controller 502 determines that a response is required, and should be sent via second communication protocol link 114, information to be placed in the response is sent to second transceiver 516 via second data and control path 514, along with control instructions needed for the transmission. In response to the control instructions received from controller 502, second transceiver 516 transmits the response message in consonance with the second communication protocol to second antenna 520 via second feedline 518. At second antenna 520 the response message is coupled to second communication protocol link 114 via second radiation 522.

To receive a message sent via second communication protocol link 114, the message is coupled via second radiation 522 to second antenna 520, and then to second transceiver 516 via second feedline 518. Second transceiver 516 receives the message in consonance with the second communication protocol, and sends the recovered information to controller 502 via second data and control path 514. Controller 502 processes the recovered information, and determines whether a response is required and, if so, whether the response should be sent via first communication protocol link 112 or second communication protocol link 114, as described supra.

For example, if a message sent via first communication protocol link 112 is Probe Response message 204, and the receiving node is candidate node 106, not yet connected to communication network 116, Probe Response message 204 is coupled via first radiation 512 to first antenna 510, and then to first transceiver 506 via first feedline 508. First transceiver 506 receives Probe Response message 204 in consonance with the first communication protocol, and sends the information recovered from Probe Response message 204 to controller 502 via first data and control path 504. Controller 502 processes the recovered information, and determines that Authentication Request message 206 should be sent via first communication protocol link 112 and DHCP Discover message 208 should be sent via second communication protocol link 114. Controller 502 then sends a first control signal to first transceiver 506 via first data and control path 504, instructing first transceiver 506 to transmit Authentication Request message 206 via the first communication protocol. Responsive to this first control signal, first transceiver 506 transmits Authentication Request message 206 via the first communication protocol. Controller 502 also sends a second control signal to second transceiver 516 via second data and control path 514, instructing second transceiver 516 to transmit DHCP Discover message 208 via the second communication protocol. Responsive to this second control signal, second transceiver 516 transmits DHCP Discover message 208 via the second communication protocol.

As a second example, first timeout timer 530 of controller 502, of a first connected node 104, expires. Responsive to the expiration, controller 502 sends a control signal to second transceiver 516 via second data and control path 514, instructing second transceiver 516 to transmit Keep-Alive message 302 of the first communication protocol via the second communication protocol. Responsive to the control signal, second transceiver 516 transmits Keep-Alive message 302 of the first communication protocol via the second communication protocol to second antenna 520 via second feedline 518. At second antenna 520, Keep-Alive message 302 is coupled to second communication protocol link 114 via second radiation 522.

At a common node 102, Keep-Alive message 302 is coupled from second communication protocol link 114 to second antenna 520 of common node 102 via second radiation 522, and then to second transceiver 516 via second feedline 518. Second transceiver 516 receives Keep-Alive message 302 in consonance with the second communication protocol, and sends the recovered information to controller 502 via second data and control path 514. Controller 502 processes the recovered information and, in response to the reception of Keep-Alive message 302 by common node 102, timeout timer 530 of common node 102 is reset.

In general, the physical (PHY) and lower layers of the communication protocol stack of the first communication protocol are performed in first transceiver 506, and the physical (PHY) and lower layers of the communication protocol stack of the second communication protocol are performed in second transceiver 516. Without departing from the scope of the present disclosure, also contemplated are other embodiments, including at least embodiments in which at least one of first transceiver 506 and second transceiver 516 is implemented as one or more software defined radios (SDRs), embodiments in which first antenna 510 and second antenna 520 are implemented as a single antenna, embodiments in which at least one of first antenna 510 and second antenna 520 is implemented as one or more antenna arrays and embodiments in which at least one of first antenna 510 and second antenna 520 comprise separate antennas for transmission and reception.

Figure 6:
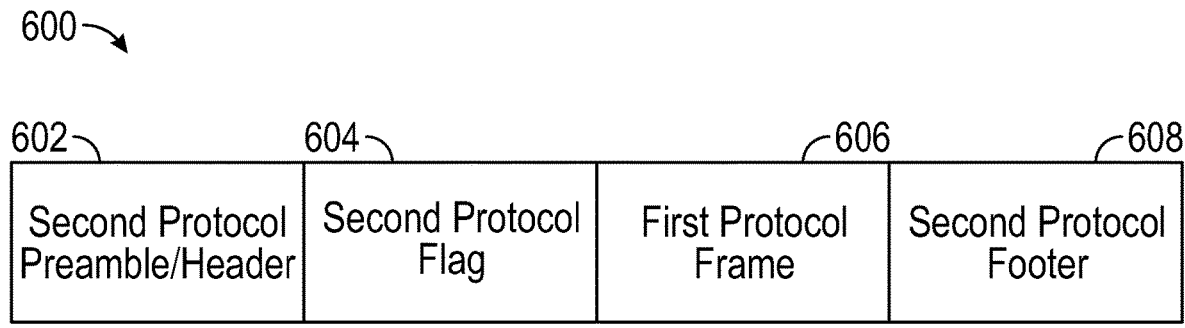
FIG. 6 illustrates a packet format, in accordance with an embodiment.
Figure 7:
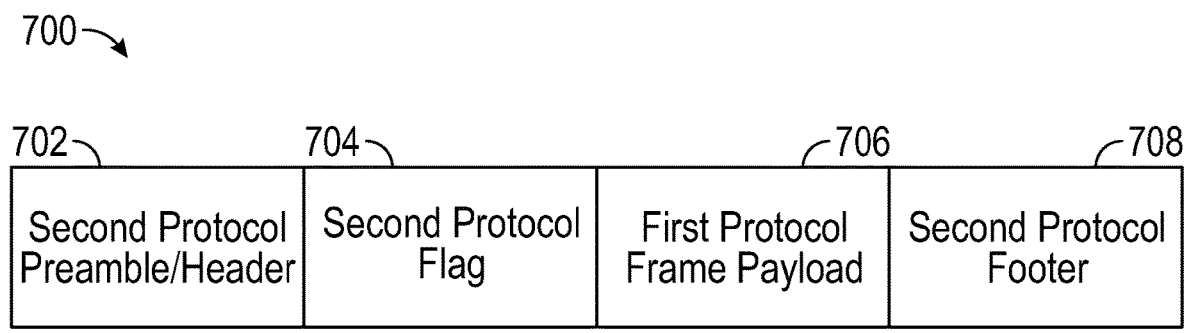
FIG. 7 illustrates a packet format, in accordance with an embodiment.

The upper layers of each communication protocol stack are performed in entities of controller 502, which is further configurable to construct frames 600 and/or 700 as described infra in reference to FIG. 6 and FIG. 7.

FIG. 6 depicts a second communication protocol message format 600, according to an embodiment. Message format 600 is compatible with the second communication protocol, and is useful to transmit first communication protocol messages via a second communication protocol link (e.g., DHCP Discover message 208). Message format 600 comprises second protocol preamble/header 602, second protocol flag 604, first protocol frame 606, and second protocol footer 608.

Preamble/header 602 comprises physical layer synchronization and preamble functions, plus the link layer header. Second protocol flag 604 comprises a flag, compatible with the second communication protocol, indicating at least that at least one first communication protocol frame follows. First protocol frame 606 comprises at least one first communication protocol frame containing at least one first communication protocol message, less the physical layer preamble and header of each first communication protocol frame. Combining multiple first communication protocol messages into first protocol frame 606 has utility, in that it reduces the time needed to perform multiple network operations. Second protocol footer 608 comprises, e.g., a cyclic redundancy check (CRC) sequence or frame check sequence (FCS) suitable for the detection of bit errors in the packet, in consonance with the second communication protocol. Message format 600 is especially useful for, e.g., the transmission of link layer command and control functions, such as example network connection processes, for which information held in the link layer header of the first communication protocol frame is significant.

FIG. 7 depicts another second communication protocol message format 700, according to an embodiment. Message format 700 is compatible with the second communication protocol, and is useful to transmit first communication protocol messages via a second communication protocol link (e.g., DHCP Discover message 208). Message format 700 comprises second protocol preamble/header 702, second protocol flag 704, first protocol frame payload 706, and second protocol footer 708.

Preamble/header 702 comprises physical layer synchronization and preamble functions, plus the link layer header. Second protocol flag 704 comprises a flag, compatible with the second communication protocol, indicating at least that at least the data payload of a first communication protocol frame follows. Second protocol flag 704 differs from second protocol flag 604 at least in that one or more first protocol frame payloads, rather than one or more complete (less physical layer preamble and header) first protocol frames, are indicated to follow second protocol flag 704. First protocol frame payload 706 comprises the data payload(s) of at least one first communication protocol frame containing at least one first communication protocol message. As noted supra, combining multiple first communication protocol messages into first protocol frame 706 has utility, in that it reduces the time needed to perform multiple network operations. Second protocol footer 708 comprises, e.g., a cyclic redundancy check (CRC) sequence or frame check sequence (FCS) suitable for the detection of bit errors in the packet, in consonance with the second communication protocol. Message format 700 is especially useful for, e.g., the transmission of data frames for which information held outside of the payload field of the first communication protocol frame is not significant.

Figure 8:
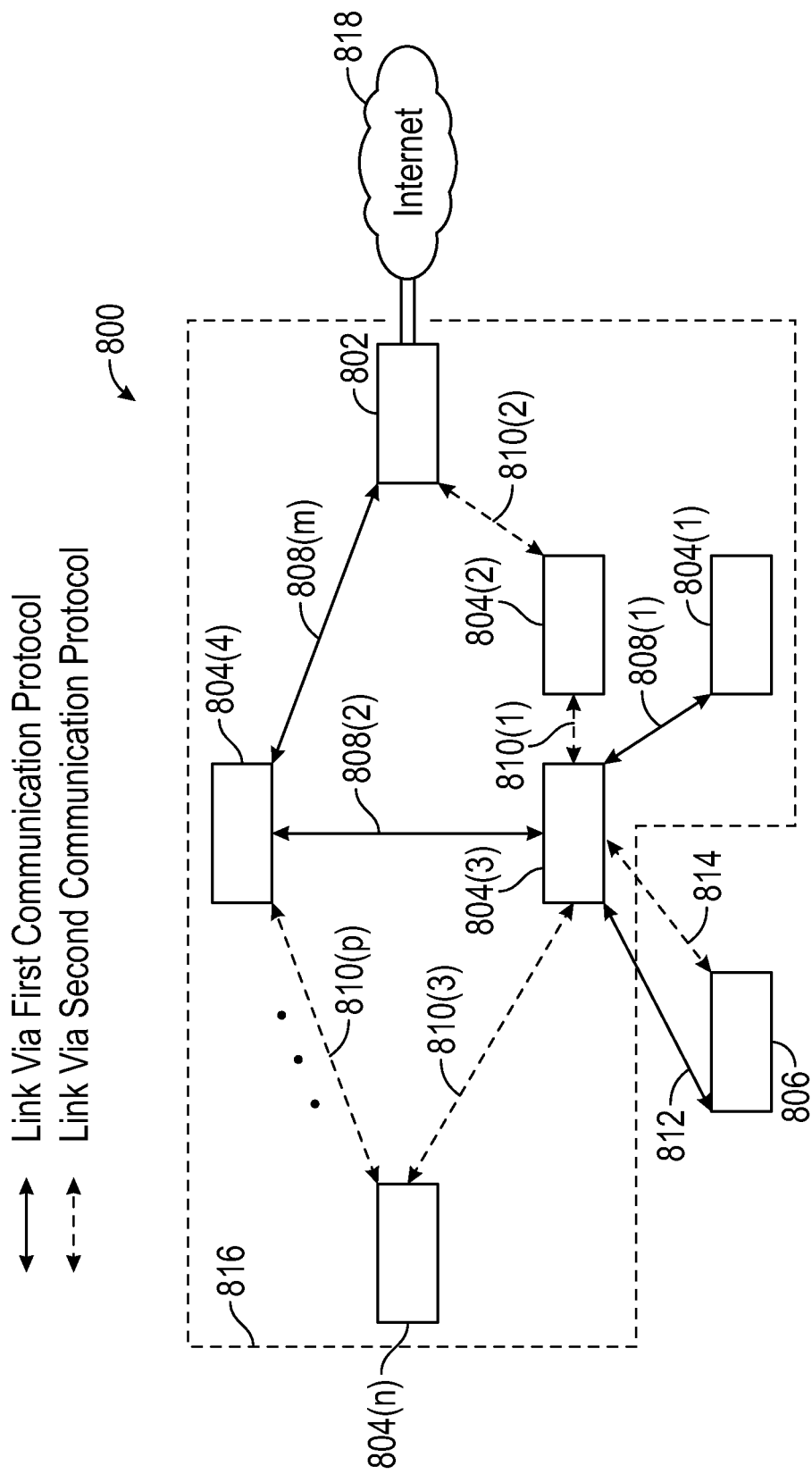
FIG. 8 illustrates a communication network, in accordance with an embodiment.

Utility of the second communication protocol is not limited by network topology or architecture. FIG. 8 shows a wireless environment 800 including communication network 816, according to an embodiment. Communication network 816 is a mesh network, or multi-hop network, in that network nodes may establish communication protocol links with any nodes in range and messages may travel through multiple nodes, and more than two communication protocol links, to reach their final destination. Communication network 816 may be, for example, a WLAN, although other types of networks, including chip-scale networks, WPANs, WBANs, WNANs, WMANs, cellular networks, etc., are also contemplated.

In communication network 816, gateway node 802 is coupled to Internet 818, and to connected nodes 804(1), 804(2), . . . , 804(n), where n is any appropriate number, via first communication protocol links 808(1), 808(2), . . . , 808(m), where m is any appropriate number, and second communication protocol links 810(1), 810(2), . . . , 810(p), where p is any appropriate number. The first communication protocol may be, for example, a wireless, local-area communication protocol, e.g., IEEE Std 802.11™ or Wi-Fi®, although other protocols are also contemplated. The second communication protocol may be, for example, a short-range, low-power, wireless communication protocol, e.g., IEEE Std 802.15.1™, Bluetooth®, Bluetooth Low Energy or Zigbee®, although other protocols are also contemplated.

Some connected nodes 804 may be coupled to communication network 816 solely via a first communication protocol link (e.g., connected node 804(1) coupled via first communication protocol link 808(1)); some connected nodes 804 may be coupled to communication network 816 solely via second communication protocol links (e.g., connected node 804(2) coupled via second communication protocol links 810(1) and 810(2)); and some connected nodes may be coupled to communication network 816 via first communication protocol links and second communication protocol links (e.g., connected node 804(3) coupled via first communication protocol links 808(1) and 808(2) and second communication protocol links 810(1) and 810(3)).

Candidate node 806 differs from connected nodes 804 in that it is not connected to communication network 816. Candidate node 806 can, however, communicate to communication network 816 via first communication protocol link 812 and second communication protocol link 814 to perform an improved network connection process as described supra, in accordance with an embodiment. It can be understood from FIG. 8 that, since communication network 816 is a mesh or multi-hop network, candidate node 806 need not exchange messages of the disclosed improved network connection process with connected node 804(3), but may use connected node 804(3) to relay such messages, to be exchanged with any appropriate network node as determined by the node assignments (e.g., DHCP server) of communication network 816.

Figure 9:
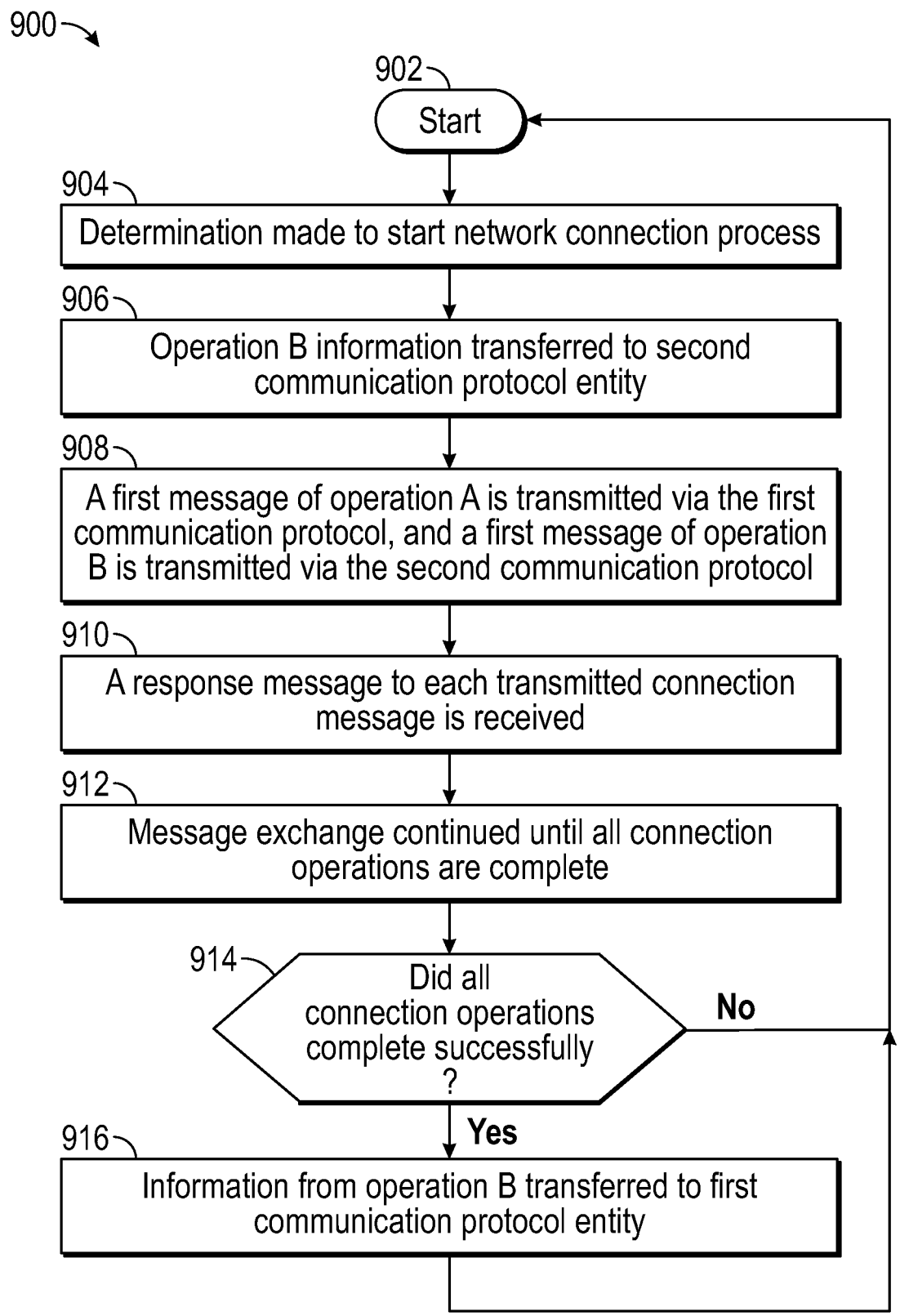
FIG. 9 illustrates a flowchart in accordance with an embodiment.

FIG. 9 shows a flowchart 900 according to an embodiment. The algorithm 900 begins (902).

A determination is made to start the network connection process for a candidate node, as yet unconnected to the communication network (904). The candidate node was described in relation to FIG. 1 as candidate node 106 and the communication network as communication network 116. This process may require, e.g., two message exchange operations, connection operation A and connection operation B, of a first communication protocol, e.g., Wi-Fi®. Connection operation A may be, for example, the Wi-Fi® connection process and connection operation B may be, for example, a DHCP DORA operation. For purposes of exposition, connection operation A is performed via the first communication protocol and connection operation B is performed via a second communication protocol, e.g., Bluetooth®, although either connection operation may be performed via either communication protocol.

Information needed to perform connection operation B is transferred to a second communication protocol entity (906). This entity may be located, e.g., in controller 502, and the information may be transferred from, e.g., a first communication protocol entity also in controller 502. For the DHCP DORA operation example of connection operation B, the information may be, e.g., at least a media access control (MAC) address.

A first message of connection operation A is transmitted via the first communication protocol, and a first message of connection operation B is transmitted via the second communication protocol (908). The first message of connection operation A was described in relation to FIG. 2 as Authentication Request message 206 and the first message of connection operation B was described in relation to FIG. 2 as DHCP Discover message 208. As noted supra, both messages are of the first communication protocol.

A response message to the first message of connection operation A, and a response message to the first message of connection operation B, are received (910). The response message to the first message of connection operation A was described in relation to FIG. 2 as Authentication Response message 210, and the response message to the first message of connection operation B was described in relation to FIG. 2 as DHCP Offer message 212.

The message exchange is continued until all connection operations complete (912).

A determination is made whether all connection operations completed successfully (914). If not, the algorithm begins (902).

If all connection operations completed successfully, information obtained as a result of the completion of connection operation B is transferred to the first communication protocol entity (916), and the process begins. For the DHCP DORA operation example of connection operation B, the information may be, e.g., at least an Internet Protocol (IP) address.

Figure 10:
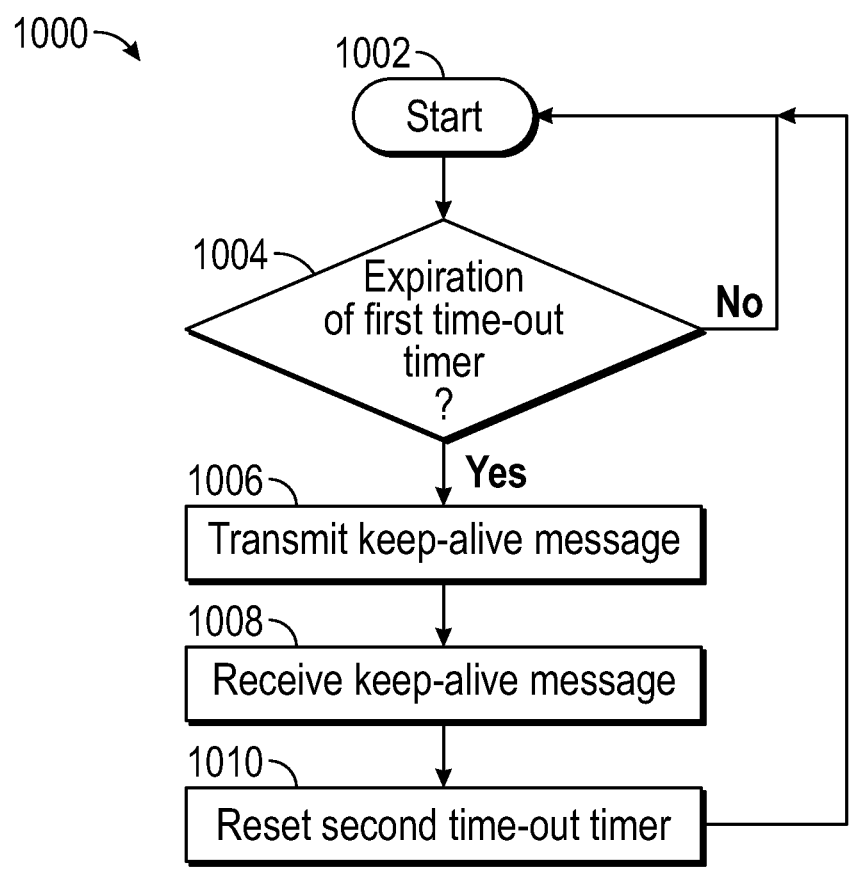
FIG. 10 illustrates a flowchart in accordance with an embodiment.

FIG. 10 shows a flowchart 1000 according to an embodiment. The algorithm 1000 begins (1002).

A determination is made whether a first timeout timer of a first communication protocol, of a first node, has expired (1004). If not, the algorithm begins (1002). The first timeout timer was described in relation to FIG. 5 as timeout timer 530 of controller 502, of a first connected node 104, and the first node was described in relation to FIG. 3 as connected node 104.

If the first timeout timer has expired, a Keep-Alive message of the first communication protocol is transmitted by the first node via a second communication protocol (1006). The Keep-Alive message was described in relation to FIG. 3 and FIG. 5 as Keep-Alive message 302.

The Keep-Alive message of the first communication protocol is received by a second node via the second communication protocol (1008). The second node was described in relation to FIG. 3 as common node 102.

Responsive to reception by the second node of the Keep-Alive message of the first communication protocol, a second timeout timer of the first communication protocol, of the second node, is reset (1010), and the process begins. The second timeout timer was described in relation to FIG. 5 as timeout timer 530 of controller 502, of common node 102.

The series of operations 900 (FIG. 9) and 1000 (FIG. 10) may be stored on non-volatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the apparatus, system and methods presented herein provide an advancement in the state of the art.

Accordingly, some of the disclosed embodiments are set out in the following. The embodiments described herein are combinable.

In one embodiment, a method for connecting to a communication network includes transmitting a first connection message of a first communication protocol via the first communication protocol, and transmitting a second connection message of the first communication protocol via a second communication protocol, the transmitting the first connection message and the transmitting the second connection message occurring prior to connection to the communication network.

In another embodiment of the method for connecting to a communication network, the method further includes receiving a response message to the second connection message prior to connection to the communication network.

In another embodiment of the method for connecting to a communication network, the response message is at least one of a Dynamic Host Configuration Protocol (DHCP) Discover message, Offer message, Request message, and Acknowledge message.

In another embodiment of the method for connecting to a communication network, the DHCP Acknowledge message is received prior to an association response message.

In another embodiment of the method for connecting to a communication network, the first communication protocol is a wireless, local-area communication protocol.

In another embodiment of the method for connecting to a communication network, the second communication protocol is a short-range, low-power, wireless communication protocol.

In another embodiment of the method for connecting to a communication network, the first connection message is at least one of a probe request message, a probe response message, an authentication request message, an authentication response message, an association request message, and an association response message.

In another embodiment of the method for connecting to a communication network, the second connection message is at least one of a probe request message, a probe response message, an authentication request message, an authentication response message, an association request message, and an association response message.

In another embodiment of the method for connecting to a communication network, the second connection message is at least one of a Dynamic Host Configuration Protocol (DHCP) Discover message, Offer message, Request message, and Acknowledge message.

In another embodiment of the method for connecting to a communication network, the DHCP Acknowledge message is transmitted prior to an association response message.

In another embodiment of the method for connecting to a communication network, the communication network is at least one of a mesh network and a multi-hop network.

In one embodiment, a method to remain connected to a communication network includes transmitting, by a first node of the communication network, a keep-alive message via a second communication protocol in response to an expiration of a first timeout timer of a first communication protocol, and resetting a second timeout timer of the first communication protocol in response to reception of the keep-alive message by a second node of the communication network.

In another embodiment of the method to remain connected to a communication network, the first communication protocol is a wireless, local-area communication protocol.

In another embodiment of the method to remain connected to a communication network, the second communication protocol is a short-range, low-power, wireless communication protocol.

In another embodiment of the method to remain connected to a communication network, the communication network is at least one of a mesh network and a multi-hop network.

In one embodiment, an apparatus includes a first transceiver, configured to transmit and receive signals compatible with a first communications protocol; a second transceiver, configured to transmit and receive signals compatible with a second communications protocol; and a controller, coupled to the first transceiver and the second transceiver, configured to generate at least one control signal of the first transceiver and at least one control signal of the second transceiver; the first transceiver further configured to transmit a first connection message of the first communication protocol via the first communication protocol, in response to reception of the at least one control signal of the first transceiver; the second transceiver further configured to transmit a second connection message of the first communication protocol via the second communication protocol, in response to reception of the at least one control signal of the second transceiver, and the transmission of the first connection message and the transmission of the second connection message occur prior to connection to the communication network.

In another embodiment of the apparatus, the first communication protocol is a wireless, local-area communication protocol.

In another embodiment of the apparatus, the second communication protocol is a short-range, low-power, wireless communication protocol.

In another embodiment of the apparatus, at least one of the first transceiver and the second transceiver is further configured to receive a response message to the second connection message prior to connection to the communication network.

In another embodiment of the apparatus, the communication network is at least one of a mesh network or a multi-hop network.

In one embodiment, an apparatus to remain connected to a communication network includes a first timeout timer of a first communication protocol; a transmitter of a first node of the communication network, coupled to the first timeout timer, configured to transmit signals compatible with a second communications protocol; a second timeout timer of the first communication protocol; and a receiver of a second node of the communication network, coupled to the second timeout timer, configured to receive signals compatible with the second communications protocol; the transmitter further configured to transmit a keep-alive message of the first communication protocol via the second communication protocol in response to an expiration of the first timeout timer, and the second timeout timer further configured to reset in response to reception by the receiver of the keep-alive message of the first communication protocol via the second communication protocol.

In another embodiment of the apparatus to remain connected to a communication network, the first communication protocol is a wireless, local-area communication protocol.

In another embodiment of the apparatus to remain connected to a communication network, second first communication protocol is a short-range, low-power, wireless communication protocol.

In another embodiment of the apparatus to remain connected to a communication network, the communication network is at least one of a mesh network and a multi-hop network.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. An apparatus to remain connected to a communication network, the apparatus comprising:
   a first timeout timer of a first communication protocol;
   a transmitter of a first node of the communication network, coupled to the first timeout timer, configured to:
      transmit signals compatible with a second communications protocol, and
      responsive to an expiration of the first timeout timer, transmit a keep-alive
   message of the first communication protocol via the second communication protocol;
   a second timeout timer of the first communication protocol; and
   a receiver of a second node of the communication network, coupled to the second timeout timer, configured to receive signals compatible with the second communications protocol,
   where the second timeout timer is configured to reset, responsive to reception by the receiver of the keep-alive message of the first communication protocol via the second communication protocol.

2. The method of claim 1, where the first communication protocol is a wireless, local-area communication protocol.

3. The method of claim 1, where the second communication protocol is a short-range, low-power, wireless communication protocol.

4. The method of claim 1, where the communication network is at least one of a mesh network and a multi-hop network.

5. A method to remain connected to a communication network, comprising:
- responsive to an expiration of a first timeout timer of a first communication protocol, transmitting, by a first node of the communication network, a keep-alive message via a second communication protocol; and
- responsive to reception of the keep-alive message by a second node of the communication network, resetting a second timeout timer of the first communication protocol.

6. The method of claim 5, where the first communication protocol is a wireless, local-area communication protocol.

7. The method of claim 5, where the second communication protocol is a short-range, low-power, wireless communication protocol.

8. The method of claim 5, where the communication network is at least one of a mesh network and a multi-hop network.

\* \* \* \* \*